J. A. FAIRBANKS.
Bridle-Bit.
No. 8,278. Reissued June 11, 1878.
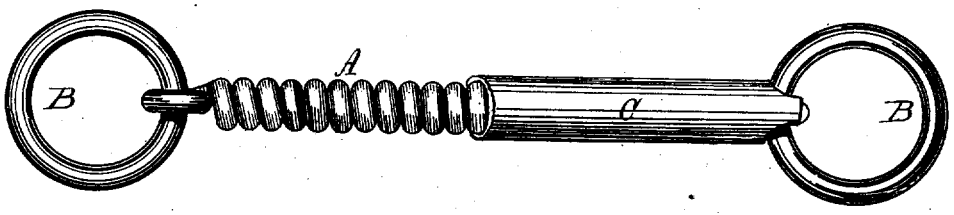
WITNESSES
Frank G. Parker
Ernest N. Boyden
INVENTOR
John A. Fairbanks
Per William Edson Atty
N. PETERS, PHOTO-LITHOGRAPHER, WASHINGTON, D. C.

UNITED STATES PATENT OFFICE.

JOHN A. FAIRBANKS, OF BOSTON, MASSACHUSETTS.

IMPROVEMENT IN BRIDLE-BITS.

Specification forming part of Letters Patent No. 172,562, dated January 25, 1876; Reissue No. 8,278, dated June 11, 1878; application filed July 30, 1877.

*To all whom it may concern:*

Be it known that I, JOHN A. FAIRBANKS, of Boston, in the county of Suffolk and State of Massachusetts, have invented a new and useful Improvement in Bridle-Bits, of which the following is a specification:

The nature of my invention consists in making the body of the bit of strong spring-wire wound into a helix, each end terminating in a loop for attaching the rein or bridle rings. This spring constitutes the entire bit, with the exception of the rubber or other covering material, the wire being so wound and of such size and temper that the bit thus constructed will yield in all directions—that is, it may curve and stretch, and thus relieve the injurious action on the horse's mouth that would otherwise result from any abrupt or violent strain upon the bridle or rein. This bit also leaves the horse with the greatest practical freedom.

The drawing represents a bit with a part of the covering removed to show the helix.

I construct my bit by winding a stiff wire closely, as shown in the drawing, so as to form a helix, A. This helix forms the entire body of the bit, there being no center part to limit the flexibility or expansion of this bit. To the ends of the helix A, I form loops, as shown, which serve to make a connection with the rein-rings B B.

To make the bit easier to the mouth I cover it with some soft pliable material, C, like rubber.

When my bit is complete it is perfectly flexible in all directions, will expand in length, is very strong, and at the same time easy for the horse, permitting him to have the greatest allowable liberty.

I claim—

In a driving or check bit, the combination of the elastic helix A, having loops at its ends, formed as shown, and the protecting covering C, with the rein-rings B B, substantially as described, and for the purpose set forth.

JOHN A. FAIRBANKS.

Witnesses:

WILLIAM EDSON,

NATHL. EVANS.